US007867360B2

(12) United States Patent
Sun et al.

(10) Patent No.: US 7,867,360 B2
(45) Date of Patent: Jan. 11, 2011

(54) GENERATION OF ACTIVE POLYSULPHIDE WITH MANGANESE AND BISMUTH CATALYSTS

(75) Inventors: Yujun Sun, Beaconsfield (CA); Richard McKinnon Berry, Notre-Dame-de-l'Ile Perrot (CA)

(73) Assignee: Fpinnovations, St. Jean, Pointe-Claire, Quebec (CA)

( * ) Notice: Subject to any disclaimer, the term of this patent is extended or adjusted under 35 U.S.C. 154(b) by 593 days.

(21) Appl. No.: 11/632,230

(22) PCT Filed: Jun. 7, 2005

(86) PCT No.: PCT/CA2005/001052

§ 371 (c)(1),
(2), (4) Date: Mar. 28, 2008

(87) PCT Pub. No.: WO2006/005161

PCT Pub. Date: Jan. 19, 2006

(65) Prior Publication Data

US 2009/0126882 A1     May 21, 2009

Related U.S. Application Data

(60) Provisional application No. 60/587,039, filed on Jul. 13, 2004.

(51) Int. Cl.
*D21C 3/00* (2006.01)
*D21C 11/00* (2006.01)
*C01B 17/22* (2006.01)

(52) U.S. Cl. .............................. 162/82; 162/29; 423/562
(58) Field of Classification Search .................. 162/29, 162/82; 423/562
See application file for complete search history.

(56) References Cited

U.S. PATENT DOCUMENTS

| 1,900,751 | A | * | 3/1933 | Baehr .......................... 423/224 |
| 3,380,931 | A | * | 4/1968 | Ryland ....................... 502/205 |
| 3,470,061 | A | | 9/1969 | Barker |
| 3,838,069 | A | * | 9/1974 | Kobayashi .................. 502/241 |
| 3,860,479 | A | | 1/1975 | Barker et al. |
| 3,928,238 | A | | 12/1975 | Koberstein et al. |
| 4,012,280 | A | | 3/1977 | Holton |
| 4,024,229 | A | | 5/1977 | Smith et al. |
| 4,075,248 | A | | 2/1978 | Marshall et al. |
| 4,290,923 | A | * | 9/1981 | Mein et al. ................... 502/303 |
| 4,783,545 | A | | 11/1988 | Glaeser et al. |
| 5,082,526 | A | | 1/1992 | Dorris |
| 6,866,748 | B2 | * | 3/2005 | Sundaram et al. ............. 162/43 |
| 6,963,009 | B2 | * | 11/2005 | Leiber et al. .................. 562/17 |
| 2002/0088576 | A1 | | 7/2002 | Andoh et al. |
| 2002/0192146 | A1 | | 12/2002 | Sundaram et al. |
| 2003/0157017 | A1 | | 8/2003 | Sundaram et al. |
| 2005/0072539 | A1 | | 4/2005 | Van Heek et al. |

FOREIGN PATENT DOCUMENTS

| WO | WO 97/19891 | 6/1977 |
| WO | WO 02/066373 | 8/2002 |

OTHER PUBLICATIONS

Dowson et al., Studies in Qualitative Inorganic Analysis. Part XLIII, 1974, Mikrochimica Acta, 339-368.*
"Carboxyl End Groups in Sulfate and Polysulfide Pulps" by B. Alfredsson et al, Department of Engineering Chemistry, Nr. 18, Sep. 30, 1963, pp. 703-706.
"Multi-Stage Polysulphide Pulping Processes" by D.W. Clayton et al, Pulp and Paper Magazine of Canada, Dec. 1967, pp. T619-T630.
"Sulphate Cooking With the Addition of Reducing Agents" by N. Hartler, The Central Laboratory of the Swedish Cellulose Industry, Stockholm, Sweden, Nr. 13, Jul. 15, 1959, pp. 468-471.
"Cooking Liquor Oxidation and Improved Cooking Technique in Polysulfide Pulping", by P.A. Landmark et al, TAPPI, vol. 48, No. 5, May 1965, pp. 56A-58A.
"Hemicelluloses and Paper Properties of Birch Pulps", by S.E. Pettersson et al, Svensk Papperstidning, 63, (1960), 762, 817, pp. 4-15.
"Factor Affecting Yield Increase and Fiber Quality in Polysulfide Pulping of Loblolly Pine, Other Softwoods, and Red Oak", by N. Sanyer et al, TAPPI, vol. 47, No. 10, Oct. 1964, pp. 640-652.
"Some Aspects of the Chemistry of Polysulfide Pulping", by A. Teder, Swedish Forest Products Research Laboratory, Stockholm, Sweden, Nr. 9, May 15, 1969, pp. 294-303.

* cited by examiner

*Primary Examiner*—Matthew J Daniels
*Assistant Examiner*—Anthony J Calandra
(74) *Attorney, Agent, or Firm*—Ogilvy Renault LLP

(57) ABSTRACT

Polysulphide produced by oxidizing white liquor includes both active and inactive components. "Active" polysulphide is the only component that increases pulp yield. The amount of active polysulphide formed when manganese oxides are used as catalysts in the generating process is increased by adding a co-catalyst. Adding bismuth compounds and, in particular, bismuth oxide as a co-catalyst increases the total amount of polysulphide formed with all the manganese oxides and increases the amount of active polysulphide produced particularly when using the lower manganese oxides. The co-catalyst also increases the number of cycles in which the most active catalyst, manganese dioxide, can participate before losing efficiency. Other elements in the same group and adjacent groups in the periodic table are active but these other elements are more soluble than bismuth and are toxic.

22 Claims, No Drawings

GENERATION OF ACTIVE POLYSULPHIDE WITH MANGANESE AND BISMUTH CATALYSTS

CROSS-REFERENCE TO RELATED APPLICATIONS

This application is a National entry of PCT/CA2005/001052 filed Jul. 6, 2005, in which the United States of America was designated and elected, and which remains pending in the International phase until Jan. 13, 2007, which application in turn claims priority from U.S. Provisional application Ser. No. 60/587,039 filed Jul. 13, 2004.

This application claims priority under 35 U.S.C. 119(e) from U.S. Provisional application Ser. No. 60/587,039 filed Jul. 13, 2004.

TECHNICAL FIELD

The present invention relates to an improvement in any process which generates polysulphide by the oxidation of sulphide-containing liquor in the presence of manganese compounds.

BACKGROUND ART

In draft pulping operations, where the goal is to remove lignin while retaining carbohydrates, yield is increased by minimizing carbohydrate (i.e., cellulose and hemicellulose) degradation. This degradation occurs through the "peeling" reaction in which sugar units are sequentially removed from the reducing end group of the polysaccharide chains. One way to prevent this reaction is to convert aldehyde groups on the wood polysaccharides to a form which is relatively inert to further "peeling". This conversion is achieved by either oxidizing the aldehyde to its corresponding carboxylic acid (Alfredsson et al., 1963), (Holton, 1977) or, alternatively, reducing it to its alcohol form (Hartler, 1959), (Pettersson et al., 1961). The two methods that are applied in the pulp and paper industry involve the oxidation process and use anthraquinone (Holton, 1977), or polysulphide (Clayton et al., 1967), (Landmark et al., 1965), (Sanyer et al., 1964), (Teder, 1969), or both as oxidizing agents. Anthraquinone is a catalytic additive while polysulphide is generated from white liquor by oxidation of sodium sulphide in one of several processes (Dorris, 1992), (Smith et al., 1977).

Polysulphide has recently been found to be a mixture of active and inactive components named herein "active" and "inactive" polysulphide. The difference between these two forms is that active polysulphide is an oxidant that can oxidize carbohydrate aldehyde groups to acids which are no longer susceptible to the peeling reaction during kraft pulping. The result of using active polysulphide is that pulp yield is increased. In contrast, inactive polysulphide cannot oxidize carbohydrate aldehyde groups and does not cause a yield increase during pulping. Both active and inactive polysulphide are measured in the gravimetric test and both are observed in spectrophotometric analysis except at 416 nm; at 416 nm, only active polysulphide is measured. The most important measurement is the ratio of PS as measured by spectrophotometry ($PS_{416}$) to PS as measured by gravimetry ($PS_{GR}$). This number describes how much of the polysulphide is active; the closer the ratio is to 1 the greater is the activity of the liquor. Heat treatment of the liquor (van Heek et al., 2004) can convert inactive polysulphide into active polysulphide.

DISCLOSURE OF THE INVENTION

The present invention seeks to increase the amount and proportion of active polysulphide in polysulphide liquors formed by the oxidation of sulphide-containing liquors in the presence of manganese compounds.

The present invention further seeks to increase the yield of pulp by applying polysulphide liquors generated by the oxidation of sulphide-containing liquors in the presence of manganese compounds which have a high active polysulphide concentration.

Still further, the present invention seeks to increase the yield of pulp by adding bismuth compounds with the manganese compounds used in the generation of polysulphide liquors by the oxidation of sulphide-containing liquors.

The present invention further seeks to maintain the catalytic activity of manganese compounds in the generation of polysulphide liquors by oxidation of sulphide-containing liquors without the need first to separate the manganese compounds from the liquor and then to heat them to recover their catalytic activity.

The invention relates to the use of co-catalysts, especially bismuth compounds in processes where polysulphide liquors are generated by the oxidation of sulphide-containing liquors in the presence of manganese compounds. Bismuth oxide ($Bi_2O_3$) is the preferred co-catalyst and is applied preferably at a metal molar $Bi_2O_3$ to $MnO_2$ ratio of 1 to 2.

In one aspect of the invention, there is provided a method of generating polysulphide by oxidation of a sulphide-containing liquor in the presence of a manganese compound as catalyst, the improvement wherein the oxidation is carried out in the further presence of a co-catalyst for the catalyst.

In another aspect of the invention, there is provided a method of producing an oxidized white liquor containing active polysulphide comprising oxidizing a white liquor with oxygen containing gas in the presence of a manganese compound as catalyst and a co-catalyst for the catalyst, said co-catalyst being effective to enhance the content of active polysulphide as a component of the total polysulphide.

In particular, the co-catalyst is effective to enhance the content of active polysulphide as a component of the total polysulphide, as compared with a method carried out without the co-catalyst.

In still another aspect of the invention, there is provided a method of increasing the yield of pulp in kraft pulping with a white liquor containing polysulphide comprising: (i) oxidizing a white liquor in the presence of a catalyst for the oxidation comprising a manganese compound, and a co-catalyst for the catalyst effective to enhance the content of active polysulphide formed in the oxidation, and (ii) delignifying pulp with the oxidized white liquor containing active polysulphide from step (i).

DESCRIPTION OF THE PREFERRED EMBODIMENTS

The process of this invention for, first, increasing the amount and proportion of active polysulphide in liquors generated by the oxidation of sulphide-containing liquor in the presence of manganese compounds and, second, maintaining the catalytic activity of the manganese compounds, is a process in which a co-catalyst, particularly a bismuth compound or compounds from metals of the same group or adjacent groups of the periodic table are used with the manganese compounds in the polysulphide generating process.

In general, the co-catalyst is employed in a metal molar ratio of co-catalyst to manganese oxide of 1:1 to 1:10; preferably 1:1 to 1:5, more preferably 2:3 to 2:5 and most preferably 1:2; more particularly these ratios are based on the metal component of the co-catalyst, for example, Bi, and Mn in the oxide forms.

The manganese oxide may be employed, with advantage, in catalytic amounts, but also may be employed in higher amounts, for example stoichiometric amounts. Suitable amounts of the manganese oxide are readily determined based on experiment and the prior literature. In particular, when the polysulphide is produced by oxidation of a white liquor and the manganese oxide is manganese dioxide, the manganese dioxide may suitably be employed in a catalytic amount of 0.1 to 2.0 g/L of the white liquor.

In particular bismuth oxide ($Bi_2O_3$) is applied at a metal molar $Bi_2O_3$ to $MnO_2$ ratio of 1 to 2 with the $MnO_2$ used for the generation of polysulphide by the oxidation of white liquor.

Manganese exists in several oxidation states and forms 4 major oxides—$Mn^{IV}O_2$, $Mn^{III}_2O_3$, $Mn^{III/II}_3O_4$ and $Mn^{II}O$. The manganese oxidation state affects the ratio of active polysulphide ($PS_{ACT}$) to gravimeteric polysulphide ($PS_{GR}$) with $PS_{GR}$ being the sum of $PS_{ACT}$ and inactive polysulphide $PS_{INACT}$. The higher the oxidation state of the manganese oxide the greater the amount of gravimetric and active polysulphide formed. Tie active polysulphide concentration is lower and the inactive polysulphide concentration higher when using a catalytic rather than a stoichiometric amount of manganese compound which indicates that manganese compounds, when used as catalysts, are not effectively regenerated to the required oxidation state.

The co-catalyst such as $Bi_2O_3$ increases the number of cycles or time that the catalyst retains its catalytic activity, in the production of oxidized white liquor containing active polysulphide.

This discussion identifies the importance of the oxidation state of the oxide and the value of maintaining the oxide in the highest oxidation state possible. It has been found that bismuth compounds enhance the performance of manganese compounds in the polysulphide generation process.

EXAMPLES

Example 1

$Bi_2O_3$ was mixed with $MnO_2$ in a 1 to 5 metal molar ratio. Air was employed as oxidant to regenerate the catalyst. Polysulphide was generated at 90° C. with magnetic stirring. $MnO_2$. (2 g/L) was used catalytically and was regenerated constantly by bubbling air (flow rate: 50 mL/min) through the liquor with a sparger. The starting white liquor had an effective alkali EA concentration of 80 g/L and a sulphide concentration (as $Na_2O$) of 40 g/L. Reaction time was either 120 or 240 minutes. The active polysulphide was measured by UV-VIS analysis and the amount was determined by the peak intensity at 416 nm. The inactive polysulphide was determined as the difference between the amount of PS measured by gravimetric and by UV-VIS (spectrometric) analyses. The table shows the results of applying the co-catalyst and the changes that occur as the polysulphide generation time is extended and the liquor is heat treated. Heat treatment is the method of improving the $PS_{ACT}/PS_{GR}$ ratio of polysulphide liquors produced by oxidation processes described in van Heek et al., 2004. The liquor was heat treated at 90° C. for 120 min with no air and no stirring but in the presence of the catalyst.

In the presence of bismuth oxide, the table shows that: after 120 minutes, the active polysulphide concentration is increased from 3.02 g/L to 3.87 g/L while the inactive polysulphide is decreased from 3.20 to 2.11 g/L; after 240 minutes, the active polysulphide concentration is increased from 4.17 g/L to 5.23 g/L while the inactive polysulphide is decreased from 3.51 to 2.79 g/L; and after heat treatment, the active polysulphide concentration is increased from 5.22 g/L to 6.10 g/L while the inactive polysulphide is decreased from 1.10 to 0.42 g/L;

TABLE I

PS generation with/without Bi compound under air

| | 120 min (g/L) | 240 min (g/L) | Heat treatment (g/L) |
|---|---|---|---|
| a) $MnO_2$ plus $Bi_2O_3$ | | | |
| Active PS | 3.87 | 5.23 | 6.10 |
| Inactive PS | 2.11 | 2.79 | 0.42 |
| b) $MnO_2$ only | | | |
| Active PS | 3.02 | 4.17 | 5.22 |
| Inactive PS | 3.20 | 3.51 | 1.10 |

Example 2

$Bi_2O_3$ was mixed with $MnO_2$ in a 1 to 5 metal molar ratio. Oxygen was employed as oxidant to regenerate the catalyst. Polysulphide was generated at 90° C. with magnetic stirring. $MnO_2$ (2 g/L) was used catalytically and was regenerated constantly by bubbling oxygen (flow rate: 20 mL/min) through the liquor with a sparger. The starting white liquor had an effective alkali EA concentration of 80 g/L and a sulphide concentration (as $Na_2O$) of 40 g/L. Reaction time was either 120 or 240 minutes. Tie active polysulphide was measured by UV-VIS (spectrometric) analysis and the amount was determined by the peak intensity at 416 nm. The inactive polysulphide was determined as the difference between the amount of PS measured by gravimetric and by UV-VIS analyses. The table shows the results of applying the co-catalyst and the changes that occur as the polysulphide generation time is extended and the liquor is heat treated. Heat treatment is the method of improving the $PS_{ACT}/PS_{GR}$ ratio of polysulphide liquors produced by oxidation processes described in van Heek et al., 2004. The liquor was heat treated at 90° C. for 120 min with no air and no stirring but in the presence of the catalyst.

In the presence of bismuth oxide, the table shows that: after 120 minutes, the, active polysulphide concentration is increased from 3.11 g/L to 4.01 g/L while the inactive polysulphide is decreased from 3.45 to 2.45 g/L; after 240 minutes, the active polysulphide concentration is increased from 4.23 g/L to 5.31 g/L while the inactive polysulphide is decreased from 4.72 to 3.79 g/L; and after heat treatment, the active polysulphide concentration is increased from 5.19 g/L to 5.92 g/L while the inactive polysulphide is decreased from 1.21 to 1.16 g/L;

TABLE 2

PS generation with/without Bi compound under oxygen

|  | 120 min (g/L) | 240 min (g/L) | Heat treatment (g/L) |
|---|---|---|---|
| a) $MnO_2$ plus $Bi_2O_3$ | | | |
| Active PS | 4.01 | 5.31 | 5.92 |
| Inactive PS | 2.45 | 3.79 | 1.16 |
| b) $MnO_2$ only | | | |
| Active PS | 3.11 | 4.23 | 5.19 |
| Inactive PS | 3.45 | 4.72 | 1.21 |

Example 3

$Bi_2O_3$ was mixed with $MnO_2$ in different metal molar ratios. Oxygen was employed as oxidant to regenerate the catalyst. Polysulphide was generated at 90° C. with magnetic stirring. $MnO_2$ (2 g/L) was used catalytically and was regenerated constantly by bubbling oxygen (flow rate: 20 mL/min) through the liquor with a sparger. The starting white liquor had an effective alkali EA concentration of 80 g/L and a sulphide concentration (as $Na_2O$) of 40 g/L. Reaction time was 120 minutes. The active polysulphide was measured by UV-VIS analysis and the amount was determined by the peak intensity at 416 nm. The inactive polysulphide was determined as the difference between the amount of PS measured by gravimetric and by UV-VIS (spectrometric) analyses.

Table 3 shows the results of applying different amounts of the co-catalyst. The optimum ratio of $Bi_2O_3$ to $MnO_2$ under the conditions studied is 1:2. This ratio gave 4.69 g/L of active polysulphide and 8.10 g/L of gravimetric polysulphide Doubling the amount of bismuth to give a ratio of $Bi_2O_3$ to $MnO_2$ of 1:1 only provided a marginal further improvement in active and gravimetric polysulphide concentrations.

TABLE 3

The effect of the amount of Bi compound added

| $MnO_2/Bi_2O_3$ (metal molar ratio) | $PS_{416}$ (g/L) | $PS_{GR}$ (g/L) |
|---|---|---|
| 10/1 | 4.09 | 6.30 |
| 5/1 | 4.01 | 6.46 |
| 2/1 | 4.69 | 8.10 |
| 1/1 | 4.81 | 8.13 |

Example 4

$Bi_2O_3$, $Bi_2S_3$ or $Bi(NO_3)_3 \cdot 5H_2O$ was mixed with $MnO_2$ in a 1 to 5 metal molar ratio. Oxygen was employed as oxidant to regenerate the catalyst. Polysulphide was generated at 90° C. with magnetic stirring. $MnO_2$ (2 g/L) was used catalytically and was regenerated constantly by bubbling oxygen (flow rate: 20 mL/min) through the liquor with a sparger. The starting white liquor had an effective alkali EA concentration of 80 g/L and a sulphide concentration (as $Na_2O$) of 40 g/L. Reaction time was 120 minutes. The active polysulphide was measured by UV-VIS analysis and the amount was determined by the peak intensity at 416 nm. The inactive polysulphide was determined as the difference between the amount of PS measured by gravimetric and by UV-VIS (spectrometric) analyses.

Table 4 shows that similar results were obtained with all of these compounds. Among the three bismuth compounds tested, $Bi_2O_3$ is preferred.

TABLE 4

PS generation with different Bi compounds as co-catalyst

| Bi compound | $MnO_2$/Bi compound (metal molar ratio) | $PS_{416}$ (g/L) | $PS_{GR}$ (g/L) |
|---|---|---|---|
| $Bi_2O_3$ | 5/1 | 4.01 | 6.46 |
| $Bi_2S_3$ | 5/1 | 3.83 | 5.89 |
| $Bi(NO_3)_3 \cdot 5H_2O$ | 5/1 | 3.95 | 6.14 |

Example 5

The catalyst, $MnO_2$ or, $MnO_2$ combined with $Bi_2O_3$ in a 2 to 1 metal molar ratio, was reused three times by carefully removing the oxidized polysulphide liquor after reaction and adding the same amount of white liquor for the next reaction. Oxygen was employed as oxidant to regenerate the catalyst. Polysulphide was generated at 90° C. with magnetic stirring. $MnO_2$ (2 g/L) was used catalytically and was regenerated constantly by bubbling oxygen (flow rate: 20 mL/min) through the liquor with a sparger. The starting white liquor had an effective alkali EA concentration of 80 g/L and a sulphide concentration (as $Na_2O$) of 40 g/L. For each run the reaction time was 120 minutes. The active polysulphide was measured by UV-VIS analysis and the amount was determined by the peak intensity at 416 nm. The inactive polysulphide was determined as the difference between the amount of PS measured by gravimetric and by UV-VIS (spectrometric) analyses.

Table 5 shows Bi helped to maintain the reactivity of $MnO_2$. Comparing the first and the second run, the active polysulphide ($PS_{UV416}$) concentration decreased by 48%, from 3.21 to 1.66 g/L, and the total amount of polysulphide ($PS_{GR}$) decreased by 36%, from 6.74 to 4.32 g/L, when no $Bi_2O_3$ was added. With $Bi_2O_3$ added, the active polysulphide concentration only decreased by 16%, and the total amount of polysulphide decreased by 6%. Comparing the first and third run, the active polysulphide concentration decreased by 65%, and the total amount of polysulphide decreased by 54% when no $Bi_2O_3$ was added. With $Bi_2O_3$ added, the active polysulphide concentration only decreased by 23%, and the total amount of polysulphide decreased by 13%. This result is significant for polysulphide generating configurations where the catalyst is not reactivated by oxidation at high temperature.

TABLE 5

The effect of Bi addition on the reusability of $MnO_2$

| | First Run | | Second Run | | Third Run | |
|---|---|---|---|---|---|---|
| | $PS_{416}$ (g/L) | $PS_{GR}$ (g/L) | $PS_{416}$ (g/L) | $PS_{GR}$ (g/L) | $PS_{416}$ (g/L) | $PS_{GR}$ (g/L) |
| $MnO_2$ Only | 3.21 | 6.74 | 1.66 | 4.32 | 1.12 | 3.12 |
| $MnO_2$ Plus Bi | 4.77 | 8.34 | 4.02 | 7.81 | 3.65 | 7.22 |

Example 6

Manganese oxides with different oxidation states: $MnO_2$, $Mn_2O_3$ or $Mn_3O_4$ was mixed with $Bi_2O_3$ in a 2 to 1 metal molar ratio. Oxygen was employed as oxidant to regenerate the catalyst. Polysulphide was generated at 90° C. with magnetic stirring. Each manganese oxide compound (2 g/L) was used catalytically and was regenerated constantly by bubbling oxygen (flow rate: 20 mL/min) through the liquor with a sparger. The starting white liquor had an effective alkali EA concentration of 80 g/L and a sulphide concentration (as $Na_2O$) of 40 g/L. Reaction time was 120 minutes. The active polysulphide was measured by UV-VIS analysis and the amount was determined by the peak intensity at 416 nm. The inactive polysulphide was determined as the difference between the amount of PS measured by gravimetric and by UV-VIS (spectrometry).

Table 6 shows bismuth improves the performance of all the oxides particularly the lower oxide forms of manganese. With $MnO_2$, 1.58 g/L more active polysulphide and 1.54 g/L more gravimetric polysulphide were formed when $Bi_2O_3$ was added. With $Mn_2O_3$, 2.33 g/L more active polysulphide and 2.94 g/L more gravimetric polysulphide were formed when $Bi_2O_3$ was added. With $Mn_3O_4$; 2.74 g/L of active polysulphide and 2.44 g/L of gravimetric polysulphide were formed when $Bi_2O_3$ was added.

TABLE 6

Using different manganese oxides with/without Bi compound

| Catalyst | $PS_{416}$ (g/L) | $PS_{GR}$ (g/L) |
| --- | --- | --- |
| $MnO_2$ | 3.11 | 6.56 |
| $MnO_2$ plus Bi | 4.69 | 8.10 |
| $Mn_2O_3$ | 0.34 | 3.78 |
| $Mn_2O_3$ plus Bi | 2.67 | 6.72 |
| $Mn_3O_4$ | 0.21 | 3.84 |
| $Mn_3O_4$ plus Bi | 2.95 | 6.28 |

Other heavy metals compounds in the same or adjacent groups in the periodic table, such as lead, antimony are active in the same way but not to the same extent as bismuth and suffer from the further drawbacks of higher solubility in sulphide liquors and toxicity. Nickel also has activity but also has high solubility and toxicity.

LITERATURE REFERENCES

Alfredsson, B., Samuelson, O. and Sandstig, B. Carboxyl end groups in sulfate and polysulfide pulps. *Svensk Papperstidn.* 66(18):703 (1963).

Clayton, D. W. and. Salcai, A. Multi-stage polysulphide pulping processes. Part I. Basic ideas and low-temperature impregnation studies on black spruce heartwood. *Pulp Pap. Mag. Can.* 68(12):619 (1967).

Dorris, G. M. Process of producing Kraft pulping liquor by the oxidation of white liquor in the presence of lime mud. U.S. Pat. No. 5,082,526, Paprican (1992).

Hartler, N. Sulphate cooking with the addition of reducing agents. Part 1. Preliminary report on the addition of sodium borohydride. *Svensk Papperstidn.* 62(13):467 (1959).

Holton, H. H. Delignification of lignocellulosic material with an alkaline liquor in the presence of a cyclic keto compound. U.S. Pat. No. 4,012,280, C.I.L. (1977).

Landmark, P. A., Kleppe, P. J. and Johnsen, K. Cooking liquor oxidation and improved cooking teclnique in polysulphide pulping. *Tappi J.* 48(5):56 (1965).

Pettersson, S. E. and Rydholm, S. A. Hemicelluloses and paper properties of birch pulps. Part 3. *Svensk Papperstidin.* 64(1):4 (1961).

Sanyer, N. and Laundrie, J. F. Factors affecting yield increase and fiber quality in polysulphide pulping of loblolly pine, other softwoods, and red oak. *Tappi J.* 47(10):640 (1964).

Smith, G. C. and Sanders, F. W. Production of polysulphide with PTFE coated catalyst. U.S. Pat. No. 4,024,229 (1977).

Teder, A. Some aspects of the chemistry of polysulphide pulping. *Svensk Papperstidn.* 72(9):294 (1969).

Van Heek, R. P., Dorris, G., Uloth, V. C., Page, N., Hu, Q., and Leclerc, D. F., Improved kraft pulp yield by heat treatment of polysulphide liquors generated by oxidation in the presence of lime mud and/or manganese dioxide. US patent publication 2002-0144794.

The invention claimed is:

1. In a method of generating polysulphide by oxidation of a sulphide-containing liquor with an oxygen-containing gas in the presence of a manganese compound as catalyst, the improvement wherein the oxidation is carried out in the further presence of a co-catalyst for the catalyst effective to enhance the content of active polysulphide formed in the oxidation as a component of the total polysulphide comprising active polysulphide and inactive polysulphide, said co-catalyst being a bismuth compound.

2. A method according to claim 1, wherein the manganese compound is a manganese oxide.

3. A method according to claim 1, wherein the bismuth compound is a bismuth oxide.

4. A method of claim 1, wherein the co-catalyst is present in a molar ratio of the co-catalyst to the manganese compound, as oxides, of 1:1 to 1:10.

5. The method of claim 4, wherein said molar ratio is 1:1 to 1:5.

6. The method of claim 4, wherein said molar ratio is 2:3 to 2:5.

7. The method of claim 4, wherein said molar ratio is 1:2.

8. A method of increasing the yield of pulp in kraft pulping with a white liquor containing polysulphide comprising:
 (i) oxidizing a white liquor with an oxygen-containing gas in the presence of a catalyst for the oxidation comprising a manganese compound, and a co-catalyst for the catalyst effective to enhance the content of active polysulphide formed in the oxidation, said co-catalyst being a bismuth compound, and
 (ii) delignifying pulp with the oxidized white liquor containing active polysulphide from step (i).

9. A method according to claim 8, wherein the manganese compound is a manganese oxide.

10. A method according to claim 8, wherein the bismuth compound is a bismuth oxide.

11. A method of claim 8, wherein the co-catalyst is present in a molar ratio of the co-catalyst to the manganese compound, as oxides, of 1:1 to 1:10.

12. The method of claim 11, wherein said molar ratio is 1:1 to 1:5.

13. The method of claim 11, wherein said molar ratio is 2:3 to 2:5.

14. The method of claim 11, wherein said molar ratio is 1:2.

15. A method of producing an oxidized white liquor containing active polysulphide comprising:
 oxidizing a white liquor with oxygen containing gas in the presence of a manganese compound as catalyst and a co-catalyst for the catalyst, said co-catalyst being a bismuth compound and being effective to enhance the content of active polysulphide as a component of the total polysulphide, as compared with a method carried out without the co-catalyst.

16. A method according to claim 15, wherein the manganese compound is a manganese oxide.

17. A method according to claim 15, wherein the co-catalyst is bismuth oxide.

18. A method of claim 15, wherein the co-catalyst is present in a molar ratio of the co-catalyst to the manganese compound, as oxides, of 1:1 to 1:10.

19. The method of claim 18, wherein said molar ratio is 1:1 to 1:5.

20. The method of claim 18, wherein said molar ratio is 2:3 to 2:5.

21. The method of claim 18, wherein said molar ratio is 1:2.

22. A method according to claim 15, wherein the co-catalyst increases the number of cycles or time that the catalyst retains its catalytic activity.

* * * * *

UNITED STATES PATENT AND TRADEMARK OFFICE
CERTIFICATE OF CORRECTION

| | | |
|---|---|---|
| PATENT NO. | : 7,867,360 B2 | Page 1 of 1 |
| APPLICATION NO. | : 11/632230 | |
| DATED | : January 11, 2011 | |
| INVENTOR(S) | : Yujun Sun and Richard McKinnon Berry | |

It is certified that error appears in the above-identified patent and that said Letters Patent is hereby corrected as shown below:

Title Page;

In item (73) Assignee:, please correct "Fpinnovations" to ... FPINNOVATIONS ...

Signed and Sealed this
Fifth Day of April, 2011

David J. Kappos
*Director of the United States Patent and Trademark Office*